US006199172B1

(12) United States Patent
Dube et al.

(10) Patent No.: US 6,199,172 B1
(45) Date of Patent: *Mar. 6, 2001

(54) METHOD AND APPARATUS FOR TESTING THE RESPONSIVENESS OF A NETWORK DEVICE

(75) Inventors: Craig Dube, Somersworth; Michael Arsenault, Nottingham; Christopher Crowell, East Hampstead, all of NH (US)

(73) Assignee: Cabletron Systems, Inc., Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/596,064

(22) Filed: Feb. 6, 1996

(51) Int. Cl.[7] .......................... H02H 3/05; H03K 19/003
(52) U.S. Cl. .................................... 714/4; 714/11; 714/47
(58) Field of Search .................. 714/4, 47, 11, 714/43, 25, 48; 709/224, 239

(56) References Cited

U.S. PATENT DOCUMENTS

| 4,251,858 | 2/1981 | Cambique et al. | ............. 395/200 X |
| 4,545,011 | 10/1985 | Lyon et al. | ............. 364/200 |

(List continued on next page.)

FOREIGN PATENT DOCUMENTS

WO 93/10495   5/1993   (WO) .............. G06F/11/32

OTHER PUBLICATIONS

Steven L. Fulton et al., "An Introduction To Model–Baed Reasoning," AI Expert, Jan. 1990, pp. 48–55.
Rodger Knaus, "A Portable Inference Engine," AI Expert, Jan. 1990, pp. 17–20.
R. S. Gilbert et al., "CNMGRAF—Graphic Presentation Serv. for Network Mgmt.," Proc. 9th Data Comm. Symp., Sep. 10–13, 1985, pp. 199–206.
D. Bursky, "Simulator Eases Communication Network Design," Electronic Design, vol. 37, No. 21, Oct. 12, 1989, pp. 97–98, 100.
R. Cantone et al., "Model–Based Probabilistic Reasoning For Electronics Troubleshooting," Proc. 8th International Joint Conference on AI, Aug. 8–12, 1983, pp. 207–211.
W. Hseush et al., "A Network Architechure For Reliable Distributed Computing," Proc 1987 Symp. On Simulation of Computer Networks, pp. 11–22.
E. Jones et al., "Monitoring And Analysis Strategies For Digital Networks," IEEE J. On Selected Areas In Communications, vol. 6, No. 4, May 1988, pp. 715–721.

(List continued on next page.)

Primary Examiner—Dieu-Minh T. Le
(74) Attorney, Agent, or Firm—Wolf Greenfield & Sacks, P.C.

(57) ABSTRACT

Method and apparatus for fault management of computer networks which utilizes a proxy or recruit network device to test the responsiveness of a network device. When a first network device loses contact with a second network device, the first network device uses a proxy network device to determine if the second network device can be reached and reports back to the first network device whether the contact attempt was successful. The proxy network device may contact the second network device through a different path and/or protocol than used by the first network device.

19 Claims, 6 Drawing Sheets

U.S. PATENT DOCUMENTS

| | | | | |
|---|---|---|---|---|
| 4,695,946 | | 9/1987 | Andreasen et al. | 395/575 |
| 4,701,845 | | 10/1987 | Andreasen et al. | 395/575 |
| 4,827,411 | | 5/1989 | Arrowood et al. | 364/300 |
| 4,833,592 | | 5/1989 | Yamanaka | 364/188 X |
| 4,858,152 | | 8/1989 | Estes | 364/550 |
| 4,868,818 | * | 9/1989 | Madan et al. | 395/182.02 |
| 4,872,165 | * | 10/1989 | Mori et al. | 395/182.02 |
| 5,008,853 | | 4/1991 | Bly et al. | 364/900 |
| 5,038,318 | | 8/1991 | Roseman | 395/375 |
| 5,049,873 | | 9/1991 | Robins et al. | 340/825.06 |
| 5,065,399 | * | 11/1991 | Hasegawa et al. | 395/182.02 |
| 5,187,706 | * | 2/1993 | Frankel et al. | 395/182.02 |
| 5,226,120 | | 7/1993 | Brown et al. | 395/200 |
| 5,235,599 | * | 8/1993 | Nishimura et al. | 370/16 |
| 5,247,620 | * | 9/1993 | Fukuzawa et al. | 709/245 |
| 5,283,783 | * | 2/1994 | Nguyen et al. | 395/182.02 |
| 5,321,813 | * | 6/1994 | McMillen et al. | 370/228 |
| 5,408,618 | * | 4/1995 | Aho et al. | 395/284 |
| 5,408,649 | * | 4/1995 | Beshears et al. | 395/182.02 |
| 5,430,729 | * | 7/1995 | Rahnema | 395/200 |
| 5,436,909 | | 7/1995 | Dey et al. | 371/201 |
| 5,448,723 | * | 9/1995 | Rowett | 395/180 |
| 5,448,724 | | 9/1995 | Hayashi | 395/182.02 |
| 5,473,599 | * | 12/1995 | Li et al. | 395/182.02 |
| 5,513,345 | * | 4/1996 | Sato et al. | 395/182.02 |
| 5,559,955 | * | 9/1996 | Dev et al. | 395/182.02 |
| 5,581,689 | * | 12/1996 | Slominski et al. | 395/182.02 |
| 5,583,860 | * | 12/1996 | Iwakawa et al. | 370/232 |
| 5,590,277 | * | 12/1996 | Fuchs et al. | 395/183.14 |
| 5,592,611 | * | 1/1997 | Midgely et al. | 395/182.02 |
| 5,603,029 | * | 2/1997 | Aman et al. | 395/675 |
| 5,630,184 | * | 5/1997 | Roper et al. | 395/200.1 |
| 5,649,108 | * | 7/1997 | Speigel et al. | 395/200.12 |

OTHER PUBLICATIONS

M. Sutter et al., "Designing Expert Systems For Real–Time Diagnosis Of Self–Correcting Networks," IEEE Network Magazine, Sep. 1988, pp. 43–51.

L. Feldkhun et al., "Event Management As A Common Functional Area Of Open Systems Management," Integrated Network Managem ent, I. Meandzija,B. et al. (Eds.) 1989, pp. 365–376.

K. Scott, "Taking Care Of Business With SNMP," Data Communications, Mar. 21, 1990, pp. 31–41.

R. Presuhn, "Considering CMIP," Data Communications, Mar. 21, 1990. pp. 55–60

Cabletron Systems, Inc. trade Literature, "SPECTRUM And DLM, Distributed LAN Monitor (DLM)," Oct. 7, 1993.

Sakauchi, Hideki et al., "A Self–Healing Network With An Economical Spare–Channel Assignment", IEEE Telecommunications Conference & Exhibition, vol. 1 of 3, Dec. 2–5, 1990, pp. 438–443.

Bouloutas, A. et al., "Clustering Schemes For Network Management", *IEEE INfocum '91,* vol. 1, Apr. 11, 1991, pp. 111–120.

So, Young–pa et al., "Distributed Big Brother", IEEE Proceedings From the Eighth Conference on Artificial Intelligence for Applications, Mar. 2–6, 1992, pp. 295–301.

Kishimoto, R., "Distributed Cooperative Multiagent Model For Intelligent Telecommunicaton Networks", *electronics and Communications in Japan, Part 1,* vol. 75, No. 12, Dec. 1, 1992, pp. 24–37.

* cited by examiner

METHOD AND APPARATUS FOR TESTING THE RESPONSIVENESS OF A NETWORK DEVICE

FIELD OF THE INVENTION

This invention relates to fault management of computer networks and, more particularly, to a method and apparatus wherein a first network device employs a proxy or recruit network device to test the responsiveness of another network device.

BACKGROUND OF THE INVENTION

Networks provide increased computing power, sharing of resources and communications between users. A network may include a number of computer devices within a room, building, or site that are interconnected by a high speed local data link to form a local area network (LAN), such as a token ring network, ethernet network, or the like. LANs in the same or different locations may be interconnected by different media and protocols such as packet switching, microwave links and satellite links to form a wide area network. There may be several hundred or more interconnected devices in a network.

As a network becomes larger and more complex, issues arise as to the amount of traffic on the network, utilization of resources, security and the isolation of network faults. In U.S. Pat. No. 5,436,909, which issued to Roger Dev et al. on Jul. 25, 1995, and which is herein incorporated by reference in its entirety, a system for isolating network faults is disclosed. In the '909 patent, a network management system models network devices and relations between network devices. A contact status of each device is contained in a corresponding model. Each model receives status updates from and/or regularly polls the corresponding network device.

The '909 patent uses a technique known as "status suppression" in order to isolate network faults. When a first network device has lost contact with its corresponding model, the models which correspond to network devices adjacent to the first network device are polled to see if they have also lost contact with their corresponding network devices. If the adjacent models cannot contact their corresponding network devices, then presumably the first network device is not the cause of the fault and a fault status in the first model is suppressed or overridden. If it is determined that all adjacent network devices are not communicating, then the network fault can be more easily determined as something common to all of these devices.

It may be advantageous to focus the failure analysis on the first network device without polling all of the adjacent network devices. In some large networks, such polling could involve hundreds, possibly thousands, of network devices thereby increasing the amount of traffic on the network and degrading network performance. In addition, there may be network devices that, although they have lost contact with the network management system, are still in contact with some other network device.

It is an object of the present invention to provide a method to facilitate fault management in a network which can be used alone or together with other fault management services to deduce the location and/or cause of a network failure.

SUMMARY OF THE INVENTION

The present invention relates to a method and apparatus for determining the responsiveness of a network device through the use of proxy or recruit network devices. More specifically, when a first network device has lost contact with a second network device, a proxy device is recruited to attempt to contact the second network device. Typically, this recruit utilizes a different physical path to the second network device and/or a different communication protocol for contacting the second device. The recruit then reports on whether the contact was successful. If it was successful, then the first network device can infer that the cause of its contact loss may lie with its path to the second network device or with the protocol the first device uses to contact the second device.

In one embodiment, a list of potential recruits is maintained at one or more locations in the network. Then, when a first network device loses contact with a second network device, one or more recruits from the list can be selected to attempt to contact the second network device. Where a plurality of recruits are selected, the recruits may attempt to contact the second device either in series or in parallel. The recruits then report back the results of their attempts, from which a better understanding of the location and/or cause of the network failure may be determined. This method may be used alone or in combination with other fault management services. It may advantageously be used in conjunction with a network management platform, such as the SPECTRUM® management system, available from Cabletron Systems, Inc., Rochester, N.H., which models the various devices (i.e., physical devices and applications) on the network, and maintains a contact status for each such device.

These and other advantages of the present invention will be understood from the following drawings and detailed description of an exemplary embodiment.

DETAILED DESCRIPTION

Figure 1:
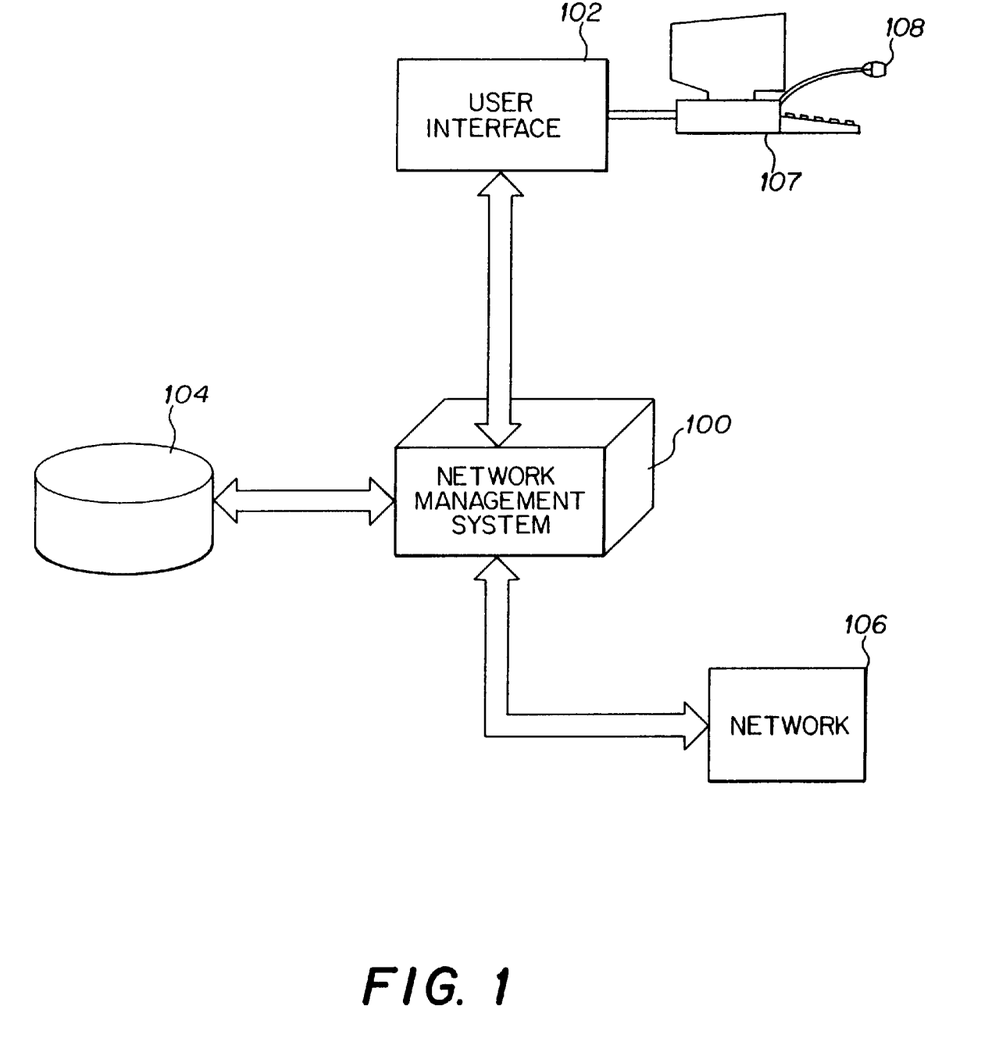
FIG. 1 is a block diagram of a network management system overseeing a network, which management system may incorporate the present invention.

A block diagram of an overall system according to the present invention is shown in FIG. 1. A network 106 includes a plurality of interconnected network devices (not shown). A network management system 100 communicates with the network 106 to maintain the network in operating condition and to monitor the operations of the network. The network management system 100 is coupled to a database manager 104 which manages the storage and retrieval of disk-based data relative to the network 106 and the network management system 100. A user interface 102 is coupled to the network management system 100 which allows a user, usually a network manager, to interface with the network management system 100. The user interface 102 includes a keyboard and display 107 and other appropriate input/output devices, e.g., a mouse or joystick 108.

The hardware for supporting a network management system as shown in FIG. 1 is typically a workstation, such as a Sun Model 3 or 4, or a PC compatible computer running Unix. Sufficient memory is required in order to run this system and may include 16 megabytes or more of memory along with a display device which supports the required color and resolution. The basic operating software which runs on the computer may support sockets, X-windows and/or the Open Software Foundation (OSF) Motif 1.0. The network management system in this embodiment is implemented using the C++ programming language; it could be implemented in another object-oriented language such as Smalltalk or ADA, or in another (non-object oriented) language such as C, Pascal, or Cobalt. The network management system 100 may comprise more than one computer, where each computer is dedicated to a particular function involved in monitoring and/or controlling the network 106.

The present embodiment was developed for the Cabletron Spectrums® platform, although the solution may be applied to a variety of network management platforms.

The present invention determines the responsiveness of a second network device (i.e., a physical device or software application) by using one or more other devices and applications which attempt to contact the second device. A "proxy" or recruit network device is defined as a network device that can be used to assist in determining or analyzing another network device's communication capability. When a second network device is determined to have become incommunicado because of a loss of contact with a first network device, a recruit network device can be used to determine if the second network device can be communicated with albeit along some different route and/or using a different protocol from that of the first device.

In this embodiment, recruit network devices "register" with a global recruiter. The global recruiter maintains a list of all recruit network devices, each recruit having a network unique identifier. The global recruiter may reside at one central location or be distributed across the network. The list is modified as devices enter and leave the network. Each time a new network device or application that can function as a recruit comes into the network, it registers itself with the global recruiter. The global recruiter does not need to know the specific protocol or means of communication of that recruit, it only needs to recognize the recruit network device's existence and have some way of communicating with the recruit.

When a fault management service within the network management system 100 recognizes that a particular network device has gone down, i.e., cannot be communicated with, a request is sent to the global recruiter for a list of possible recruit network devices. The recruits actually used in a specific case may be all or only a subset of all possible recruits, depending upon the application of certain parameters for selecting from the list. Once the desired recruits are determined, a request can be sent to each recruit asking it to determine and/or verify the responsiveness with the particular down device. When called upon, a recruit can use its own specific means of verifying this responsiveness. The verification process used can be proprietary if necessary. Only the recruit network device needs to know how the process works. Neither the fault management service of the network management system nor the global recruiter needs to know the actual protocol and process being used. This allows a general purpose algorithm the ability to have device and application models, i.e., recruits, implement very specific means of verifying communication.

The recruit network device may be considered a proxy agent for the fault management service since the recruit network device is asked by the fault management service to perform some function on its behalf, i.e., to contact the non-responsive or down device. At this point, it becomes the recruit's responsibility to test for responsiveness. Once tested, the recruit reports back to the fault management service the status and/or success of its attempt to communicate with the down device. The fault management service of the network management system then determines whether further analysis or action is required.

One advantage of this system is that the recruit may use a different communication method than that of the fault management service and/or network management system. A recruit network device may have an alternate path to the down device. It may also support a protocol different from that of the network management system and it may have some proprietary knowledge that the fault management service lacks knowledge of.

For example, one protocol which allows a device to make SNMP (Simple Network Management Protocol) requests of another device is the Distributed LAN Manager, DLM. DLM is available from Cabletron Systems, Inc., Rochester, New Hampshire. A DLM management information base (MIB) enables a user to specify the queries and querying options desired. Any device that has a DLM application built-in can enlist with the global recruiter. The fault management service can then keep track of these applications and call upon them when needed. The DLM application can utilize an entry in a DLM MIB table to attempt to reach the down device.

If a particular network device appears to be responsive to a certain recruit network device then it may be valuable to keep track of that recruit network device for future use. Generally, the network management system does not lose responsiveness with only a single device. It is more common to lose contact with an entire group of devices and/or a subnet (i.e., a logical subset of the network). When this occurs, and a recruit network device is found to make contact with one of the down devices, it is often the case that the same recruit will be able to contact other devices that are affected by that fault. Keeping track of and reusing these previously successful recruit network device saves time and network traffic.

When a developer is creating a device model based on an actual network device's capabilities, the developer may recognize that the actual network device has certain capabilities which enable it to be a proxy or recruit device, e.g., the ability to send management protocol commands or requests. As a result, the developer may create a model associated with this type of network device so that each time a device of this type is added to a network and, therefore, a model is added to the Cabletron Spectrum® System, it would be known that this device can function as a proxy or recruit. When this model is added to the network, it would know to register with the global recruiter and have itself put on a list of possible recruits.

Figure 5:
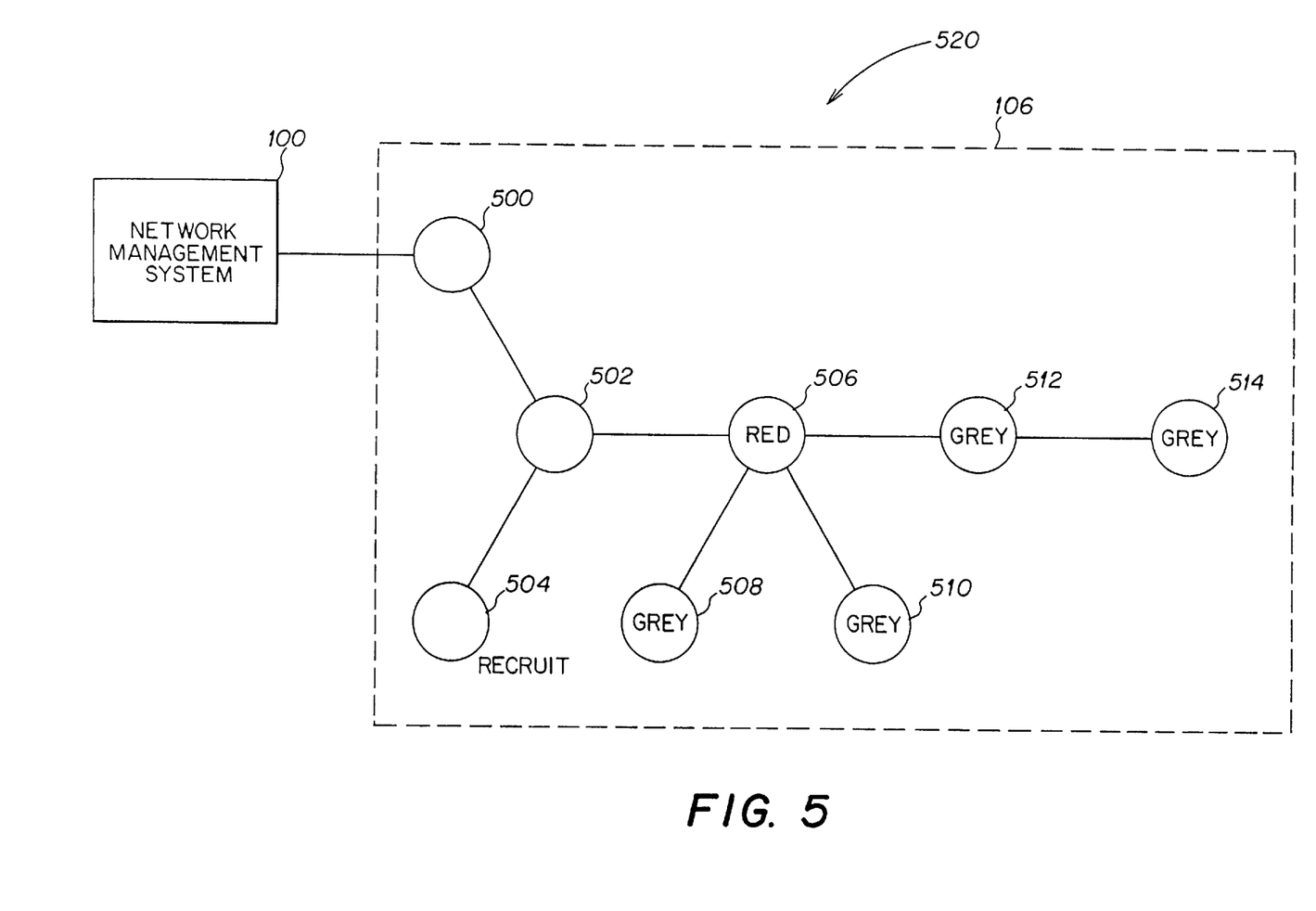
FIG. 5 is a schematic representation of a network for illustrating an exemplary use of the present invention.

FIG. 5 illustrates a Spectrum® user display 520 of the network management system 100 and the network 106. As shown in FIG. 5, network models 500–514 are shown as interconnected. Each model is an object (as in object-oriented programming), meaning that it contains data and operations relating to the device being modeled. Each model 500–514 corresponds to an actual network device with which the model is in contact. For example, model 504 represents a corresponding network device having the proxy or recruit capability defined in the model. As a result, the network management system 100 would be able to identify model 504, and its corresponding device, as a recruit network device. If, as an example, the model 506 were to lose contact with its corresponding network device, i.e., the network management system has lost contact with device 506, the system would represent the model 506 (in display 520) with the color red. It might also be the case that each of models 508–514 have also lost contact with their corresponding network devices due to the network topology in this example. These model representations would be displayed in grey. The model 506 is represented in red to indicate that, in the topology, this is the first device that is identified as no longer in communication. In other words, since the model 502 can contact its corresponding network device and the model 506, which is adjacent to model 502, cannot, the model 506 becomes a "border model." The non-border models 508–514 are grey to indicate the management system has also lost contact with them. The network management system would then request that recruit network device, represented by model 504, attempt to contact the network device represented by model 506. Model 504 may be able to contact the device represented by model 506 through device 502. This information would be returned back to the network management system 100 for analysis. As a result, the Spectrum® System may change the color of model 506 from red to orange, indicating that alternate means of communication are still available. Further, each of the remaining devices which had been indicated in grey, i.e., models 508–514, would be accessed by the recruit device model 504 to see if contact could be established. This information would also be reported back to the network management system 100. As each device is contacted, its color may be changed from grey to orange to indicate that alternate communication is still available.

One concern that may arise is the amount of traffic generated from recruit network devices. If it is necessary to limit this traffic, parameters can be implemented to limit the number of recruit network devices that are utilized. For example, these parameters may result in choosing a limited number of different recruit network devices, each of which attempts a different protocol and/or path to determine the communication ability of the down device. These parameters may include, but are not limited to, imposing a limit as to the number of recruits used, e.g., only using X number of recruit network devices; using only those recruit network devices that employ a different communication path from that of the network management system; using only those recruit network devices that employ a different communication protocol than that of the network management system; using only those recruit network devices within the same subnet as the down device; preferentially selecting recruits that have previously successfully contacted the same device, or a device in the same logical workgroup or topological group; or using only those recruit network devices that are considered immediate neighbors of the down device. In this aspect, neighbor refers to devices that are physically connected to each other. In addition, a random subset of the list of recruit network devices may also be used.

When the list of recruit network devices is determined for a down device, the recruit network devices may attempt to contact the down network device either serially or in parallel. In either case, each recruit network device would return the results of its attempted communication with the down network device, i.e., whether or not communication was successfully established.

Figure 2:
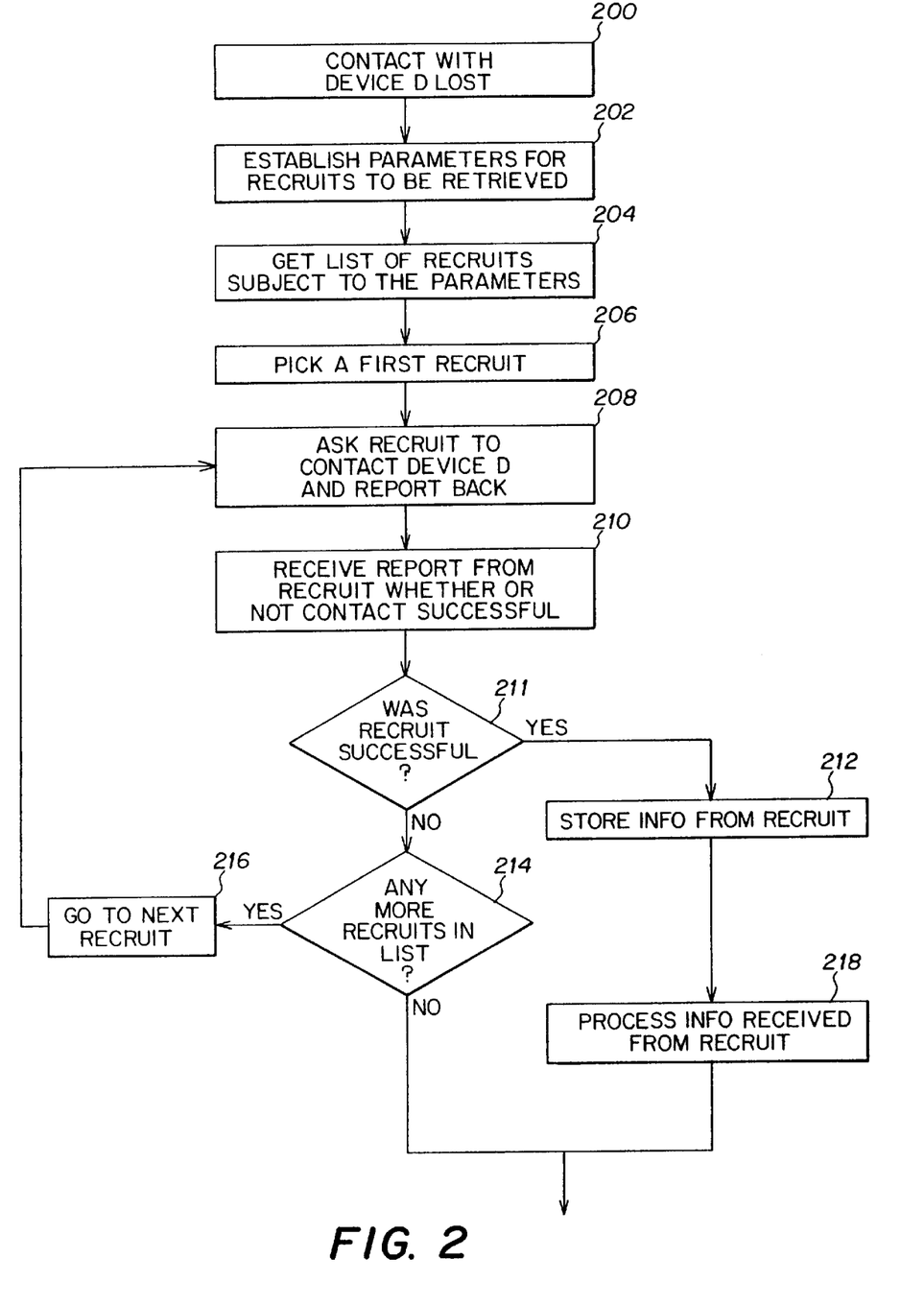
FIG. 2 is a flow chart illustrating an example of the operation of a network management system which utilizes the fault services of the present invention in accordance with one embodiment.

A flowchart of one method embodiment is presented in FIG. 2, where the recruits attempt to contact the down device in series. In step 200, contact with device D is lost. In step 202, the parameters for the recruits are established which may include, e.g., X number of recruits or only those recruits that use a different communication protocol, etc. In step 204, the list of recruits is retrieved. A first recruit is selected in step 206 and in step 208 this recruit is asked to contact device D and report back. In step 210, the report is received from the recruit regarding whether or not contact was successful. In step 211, it is determined whether the recruit was able to contact the down device D. If contact was successful, control passes to step 212 where the information from the recruit device is stored. At step 218, the information is processed by the fault analysis process. Since contact was established by a recruit, it may not be necessary to determine if there are any other recruits which can contact the device. Of course, the process can be modified to await a report from all recruits if such additional information is of value. At step 211, if the recruit was unsuccessful, control passes to step 214. In step 214, a determination is made if there are any more recruits in the list. If there are more recruits in the list, step 216 is executed where the next recruit is requested to contact down device D in step 208. If there are no more recruits in the list in step 214, operation proceeds to the end. As shown in FIG. 2, the recruits serially, one after the other, attempt communication with down device D.

Figure 3:
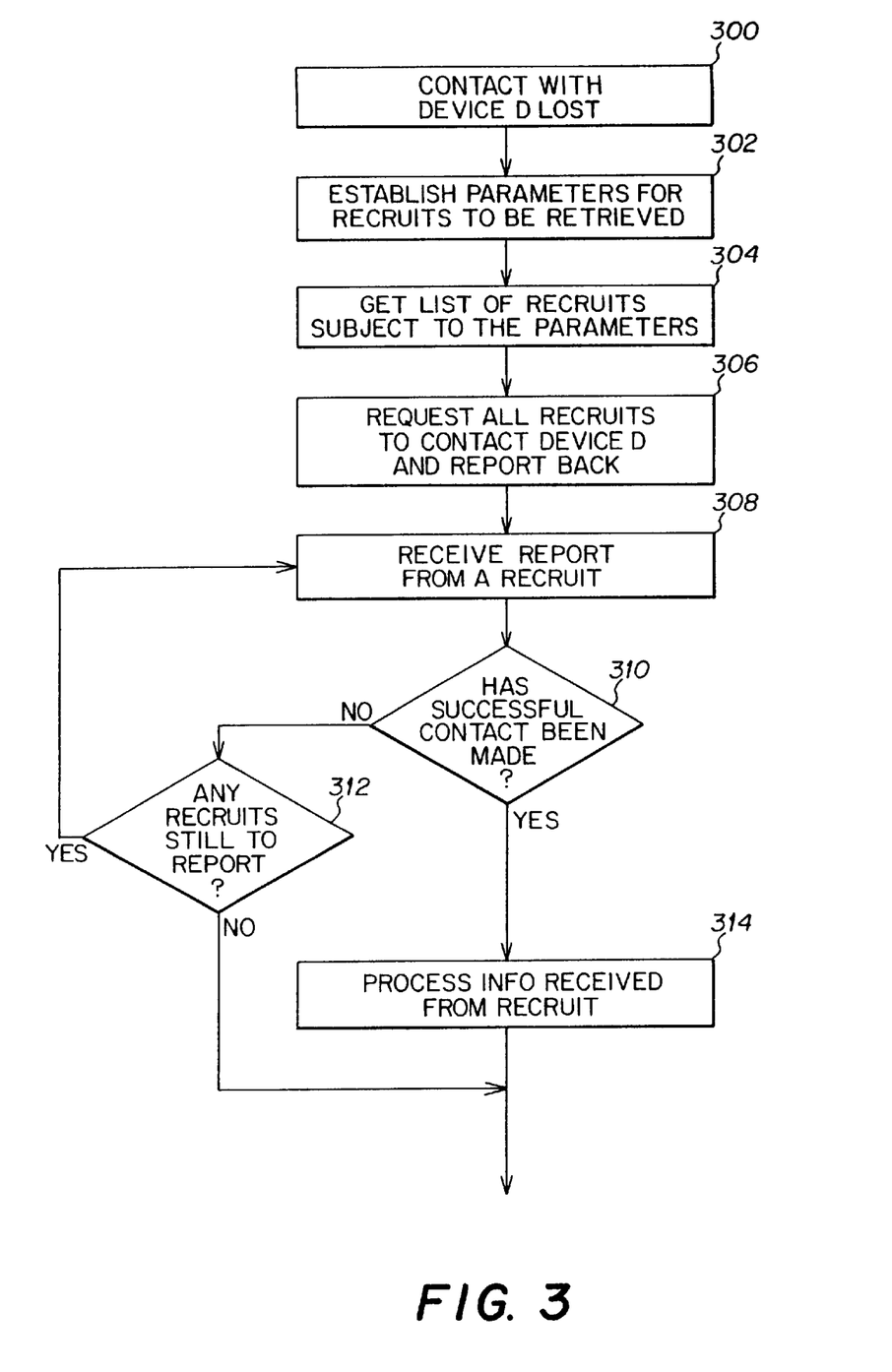
FIG. 3 is a flow chart of the fault management service according to another embodiment.

A flowchart of another method embodiment is shown in FIG. 3, where the recruits contact the down device D in parallel, i.e., at the same time. Steps 300–304 correspond to steps 200-204 in FIG. 2. In step 306, all recruits are requested to contact device D and report back. In step 308, the reports from the recruits are received. In step 310, the information received from a recruit is processed and if contact was successful, in step 314 the received information is processed. If not successful at step 310, control passes to step 312 and if there are more recruits to be heard from, control passes back to step 308 to await those reports.

The information retrieved from the processes as shown in FIGS. 2 and 3 can be used to analyze the nature and effect of the fault. The processing from this point on, steps 218 and 314, is dependent on both the network management platform and the fault management service.

Figure 4:
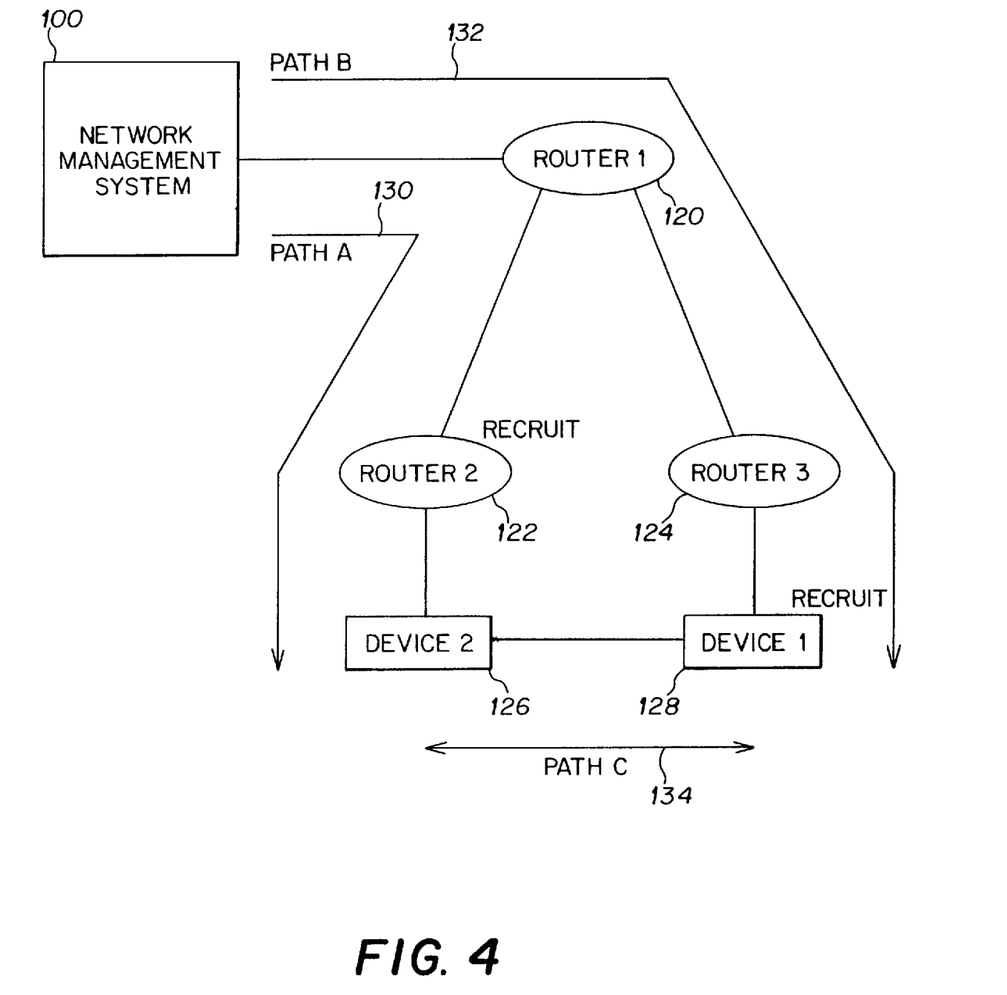
FIG. 4 is a schematic representation of a network illustrating the use of a recruit or proxy network device to contact a second network device which has lost contact with a first network is device (the network management system)

A simple example of the present method is set forth in FIG. 4. As shown in FIG. 4, both router-2 (122) and device-1(128) have enlisted with the global recruiter (part of 100) as recruit network devices. The network management system 100 talks to router-1 (120), router-2 and device-2 (126) through path-A (130). In addition, the network management system 100 talks to router-1, router-3 (124) and device-I through path-B (132). In the example, the link between router-2 and device-2 is broken and the network management system 100 can no longer communicate with device-2. The network management system 100 makes a request of the fault management service to identify whether or not device-2 is actually functioning. The fault management service retrieves the list of recruits that it should use for communication with device-2. In this simple example, there is no need to limit the list, so router-2 and device-1 are the recruit network devices in the list. The fault management service will ask the first recruit, router-2, to attempt contact with the device. As per the example, router-2 will report that it cannot communicate with device-2. Next, device-1 is requested to attempt communication with device-2. If the recruit device-1 uses path-C (134) to communicate with device-2, it will report back that it can communicate with device-2. This will identify to the network management system 100 that the failure does not lie with device-2, since device-1 has reported that it can communicate with device-2. This information can then be used to temporarily reroute data destined to and from device-2 and/or implement repair functions.

Figure 6:
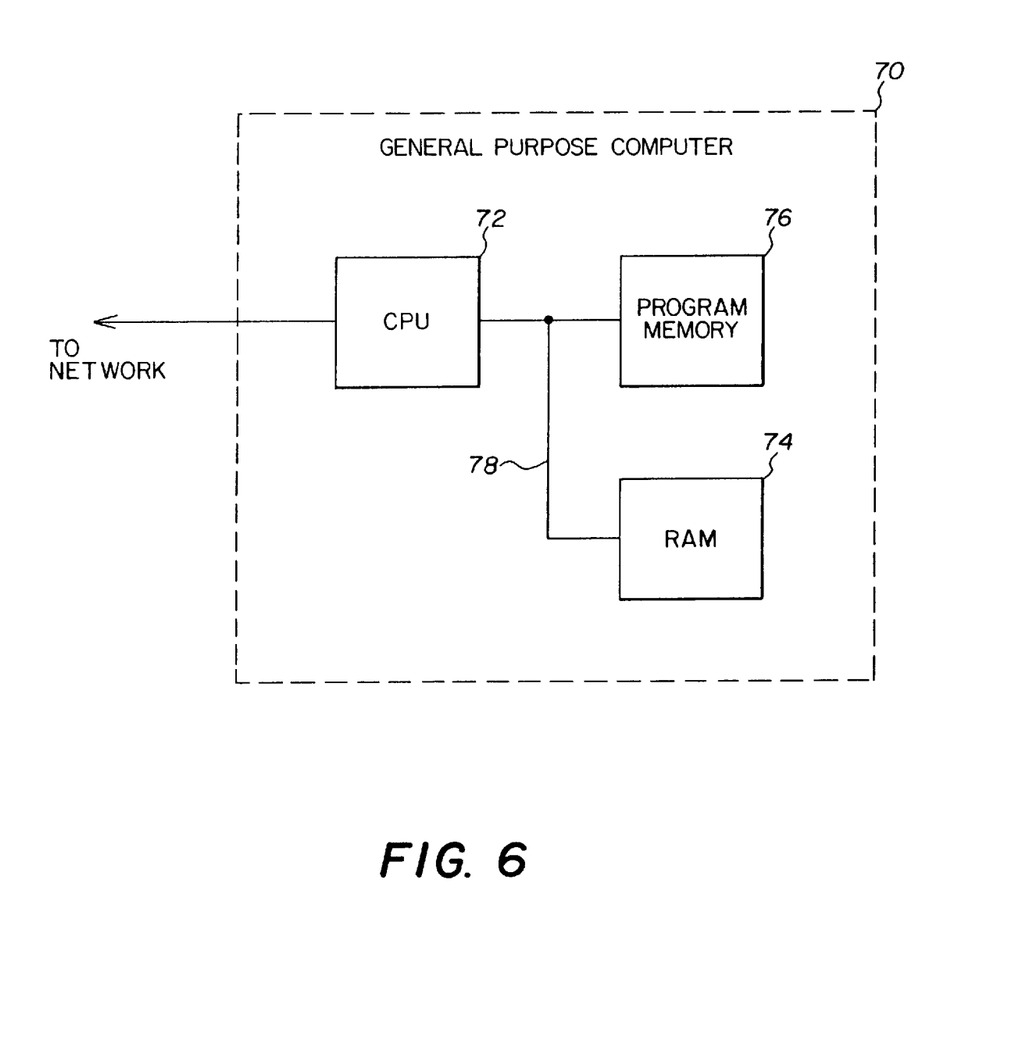
FIG. 6 shows a general purpose computer as one example of implementing the present invention.

The fault management system of the present invention may be implemented as software on a floppy disk or hard drive which controls a computer, for example a general purpose computer such as a workstation, mainframe, or personal computer to perform the steps of the processes disclosed in FIGS. 2 and. 3. Such a general purpose computer 70, as shown in FIG. 6, typically includes a central processing unit 72 (CPU) coupled to random access memory 74 (RAM) and program memory 76 via a databus 78. The general purpose computer 70 may be connected to the network in order to receive reports and provide commands to devices on the network.

Alternately, the invention may be implemented as a special purpose electronic hardware. Additionally, in either a hardware or software embodiment, the functions performed by the different elements may be combined in various arrangements of hardware and software.

While the present embodiment was developed on a Cabletron Spectrum® system which uses models of network entities and models of relations which define relations between network entities, one of ordinary skill in the art can see that this method does not have to be run on such a system. While there have been shown and described certain embodiments of the present invention, it would be obvious to those skilled in the art that various changes and modifications may be made therein without departing from the scope of the invention as defined by the appended claims.

What is claimed is:

1. A method of determining the responsiveness or non-responsiveness of a second network device in a network including a plurality of interconnected network devices, the method comprising:

when a first network device cannot communicate with the second network device along any of at least one pre-defined communication path between the first and second network devices in the network, the first network device requesting that a proxy network device verify the responsiveness or non-responsiveness of the second network device;

in response to the request from the first network device, the proxy network device attempting to communicate with the second network device; and the proxy network device sending to the first network device one of:

an indication that the second network device is responsive because the proxy network device successfully communicated with the second network device; and an indication that the second network device is non-responsive because the proxy network device did not successfully communicate with the second network device.

2. The method as recited in claim 1, wherein the proxy network device attempts to communicate with the second network device along a second path, different from the any of at least one predefined communication path between the first and second network devices in the network over which the first network device attempted to communicate with the second network device.

3. The method as recited in claim 1, wherein the proxy network device uses a second communications protocol to communicate with the second network device, different from a first communications protocol used by the first network device.

4. The method as recited in claim 1, wherein the proxy network device is on a same logical subset of the network as the second network device.

5. The method as recited in claim 1, wherein the requesting step includes selecting from a list of potential proxy network devices at least one selected proxy network device to communicate with the second network device.

6. The method as recited in claim 5, wherein the selecting step comprises selecting a proxy network device which has previously successfully communicated with the second network device.

7. The method as recited in claim 5, wherein the selecting step comprises selecting a proxy network device which has previously successfully communicated with a neighbor of the second network device.

8. The method as recited in claim 5, wherein the selecting step comprises selecting a proxy network device which has previously successfully communicated with another network device.

9. The method as recited in claim 5, wherein the selecting step is based on at least one of the following parameters:

a) a communication path from the proxy network device to the second network device is different from the any of at least one predefined communication path from the first network device to the second network device;

b) a communication protocol of the proxy network device is different from a communication protocol of the first network device;

c) the proxy network device is in a same logical subset of the network as the second network device; and d) a total number of proxy network devices in the list is not greater than a predetermined number.

10. The method as recited in claim 1, wherein the first network device requests that a plurality of proxy network devices attempt to communicate with the second network device.

11. The method as recited in claim 10, wherein the plurality of proxy network devices attempt, in parallel, to communicate with the second network device.

12. The method as recited in claim 10, wherein the plurality of proxy network devices attempt, in series, to communicate with the second network device.

13. The method as recited in claim 1, wherein the proxy network device is a neighbor of the second network device.

14. The method as recited in claim 1, further comprising the step of:

analyzing the report from the proxy network device to determine a type of fault associated with the second network device.

15. The method as recited in claim 1, further comprising the step of:

determining an operative status of the second network device from a loss of communication with the second network device.

16. The method as recited in claim 1, wherein the first network device is a network management system.

17. A method of registering a proxy network device in a computer network including a plurality of interconnected network devices, the proxy network device being capable of attempting to establish communications with a second network device to verify responsiveness or non-responsiveness of the second network device when a first network device is unable to establish communication with the second network device along any of at least one predefined communication path between the first and second network devices in the network, and, in response to a request from the first network device, the proxy network device reporting to the first network device an indication whether or not a successful communication with the second network device was established, the method comprising:

determining whether a network device can function as the proxy network device; and maintaining a list of determined proxy network devices.

18. An apparatus for determining the responsiveness or non-responsiveness of a second network device in a network of interconnected network devices, the apparatus comprising:

means for maintaining a list of proxy network devices;

means for selecting at least one proxy network device from the list of proxy network devices when a first network device cannot communicate with the second network device along any of at least one predefined communication path between the first and second network devices in the network;

means for the first network device requesting that the at least one selected proxy network device verify responsiveness or non-responsiveness of the second network device;

means for the proxy network device, in response to the requesting means, to attempt to establish communication with the second network device; and     means for the proxy network device to report back to the first network device with one of:

an indication that the second network device is responsive because the proxy network device successfully established communication with the second network device; and         an indication that the second network device is non-responsive because the proxy network device did not successfully establish communication with the second network device.

19. The apparatus of claim 18, further comprising:

means for analyzing the report from the at least one proxy network device to determine a type of fault associated with the second network device.

\* \* \* \* \*